United States Patent [19]

Burris et al.

[11] 4,232,696
[45] Nov. 11, 1980

[54] DRAIN VALVE ASSEMBLY

[75] Inventors: Robert E. Burris, New Berlin; Robert J. Budyak, Greendale, both of Wis.

[73] Assignee: Prime Manufacturing Corporation, Oak Creek, Wis.

[21] Appl. No.: 838,754

[22] Filed: Oct. 3, 1977

[51] Int. Cl.³ .......................... E03B 7/10; F16K 31/04
[52] U.S. Cl. ...................................... 137/62; 137/468; 237/80; 251/137; 251/335 A
[58] Field of Search ...................... 137/59–62, 137/301, 457, 468; 123/41.14; 251/335 A; 236/DIG. 6, DIG. 12; 237/80

[56] References Cited

U.S. PATENT DOCUMENTS

| 389,098 | 9/1888 | Newman | 137/61 |
|---|---|---|---|
| 629,794 | 8/1899 | Lindsay | 137/61 |
| 1,028,808 | 6/1912 | Campbell | 137/62 |
| 1,573,157 | 2/1926 | Giddings | 137/62 |
| 1,786,878 | 12/1930 | Van Keuren | 137/62 |
| 1,875,513 | 9/1932 | Smith | 137/61 |
| 1,996,907 | 4/1935 | Drake | 236/DIG. 6 |
| 3,415,487 | 12/1968 | Robarge | 251/137 |
| 4,065,096 | 12/1977 | Frantz et al. | 251/137 |

FOREIGN PATENT DOCUMENTS 652296  4/1951  United Kingdom ................ 251/335 A Primary Examiner—Martin P. Schwadron
Assistant Examiner—Richard Gerard
Attorney, Agent, or Firm—Michael, Best & Friedrich

[57] ABSTRACT

A drain valve for use in the cooling system of a diesel engine for a locomotive including a valve body having a drain fitting mounted in the bottom portion thereof and a solenoid operated valve assembly mounted therein for opening and closing the drain fitting. A thermostat assembly is removably mounted on the exterior of the valve body in close thermal relationship to the interior of the valve, said thermostat operable to energize the solenoid and open the drain fitting when the temperature inside the valve reaches a predetermined minimum.

3 Claims, 4 Drawing Figures

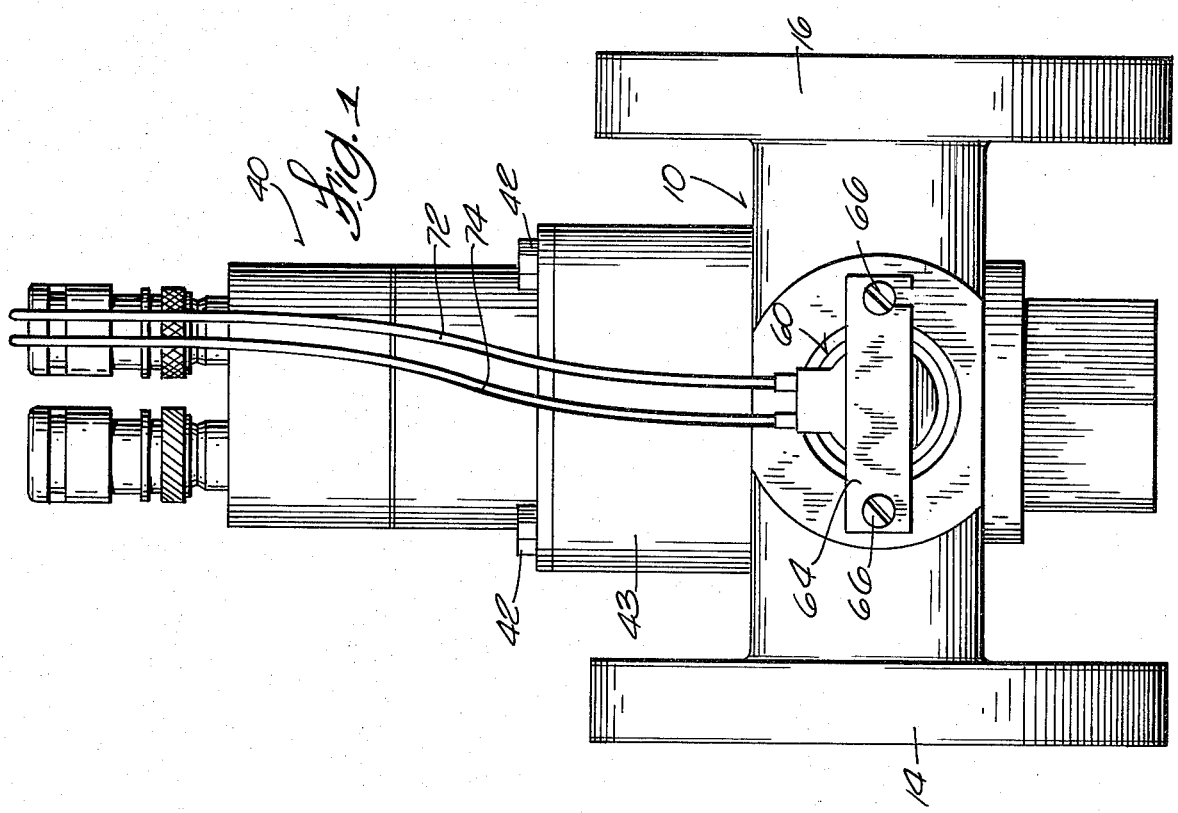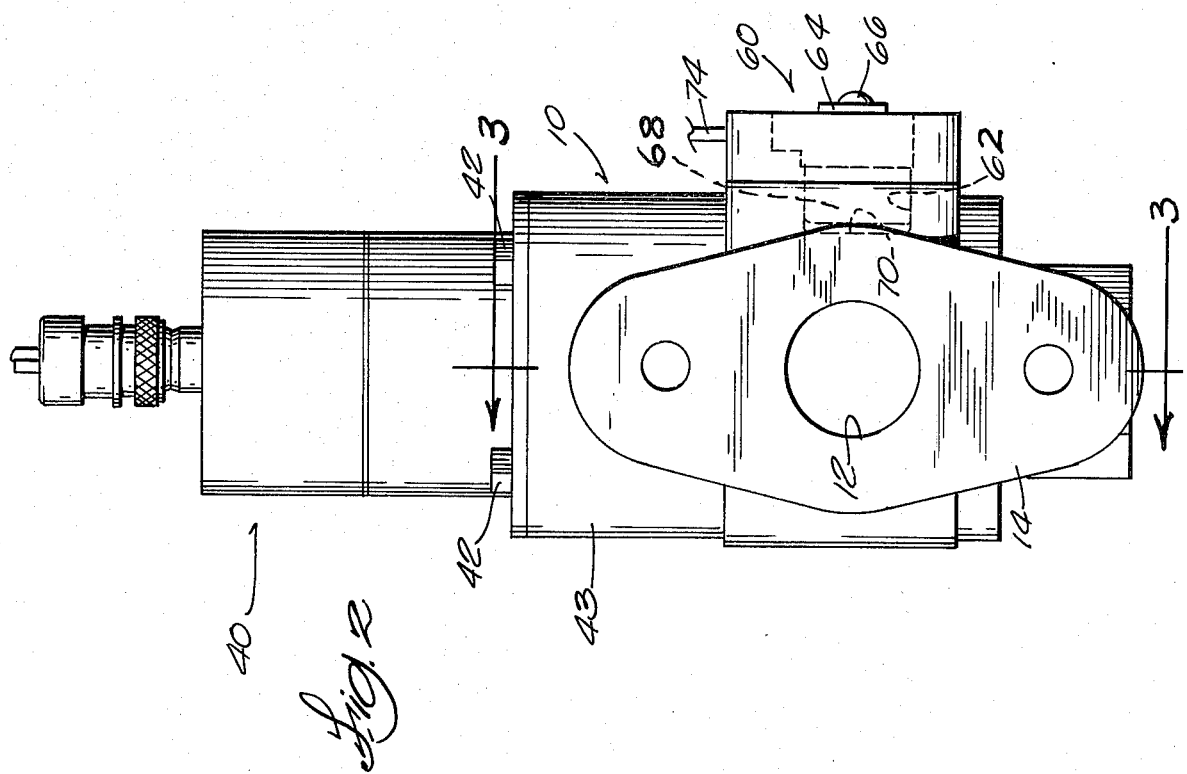

DRAIN VALVE ASSEMBLY

BACKGROUND OF THE INVENTION

I. Field of the Invention

This invention relates to a drain valve assembly and more particularly to a drain valve designed for use in the cooling system of a diesel engine for a locomotive. While diesel engines of this type are normally operated continuously when in active service, shut-downs in cold climates periodically occur, resulting in substantial damage to the equipment upon freeze-up should the shut-down go undetected for any appreciable length of time. The drain valve arrangement of the present invention provides automatic protection to the system without the necessity of any operator attention to the freeze-up condition.

II. Description of the Prior Art

Applicant is unaware of any prior drain valve assemblies of the construction and operation of that involved herein.

SUMMARY OF THE INVENTION

A drain valve assembly for a fluid system comprising a valve body having an interior cavity and means for establishing fluid connection between the cavity and the fluid system. The cavity has a thermally conducted wall portion separating the cavity from the exterior of the valve body. A drain port is located in the lower portion of the valve body and has a stationary valve seat surrounding it. A valve assembly is mounted in the cavity for reciprocal movement towards and away from the stationary valve seat. The valve assembly includes a valve seat removably mounted thereon and adapted to move into and out of sealing engagement with the stationary valve seat. The valve assembly is actuated by a solenoid operator mounted on the valve body. A thermostat assembly is removably mounted on the exterior of the valve body in close thermal relationship to the thermally conductive wall portion of the valve body. The thermostat assembly and solenoid operator are electrically connected so that when the temperature at the thermostat reaches a predetermined minimum, the solenoid operator will be energized to move the valve assembly from its closed to its open position.

DESCRIPTION OF THE DRAWINGS

FIG. 1 is a side elevation view of a drain valve assembly embodying the subject matter of the present invention;

FIG. 2 is an end elevation view of the drain valve assembly shown in FIG. 1;

DESCRIPTION OF THE PREFERRED EMBODIMENT

Figure 3:
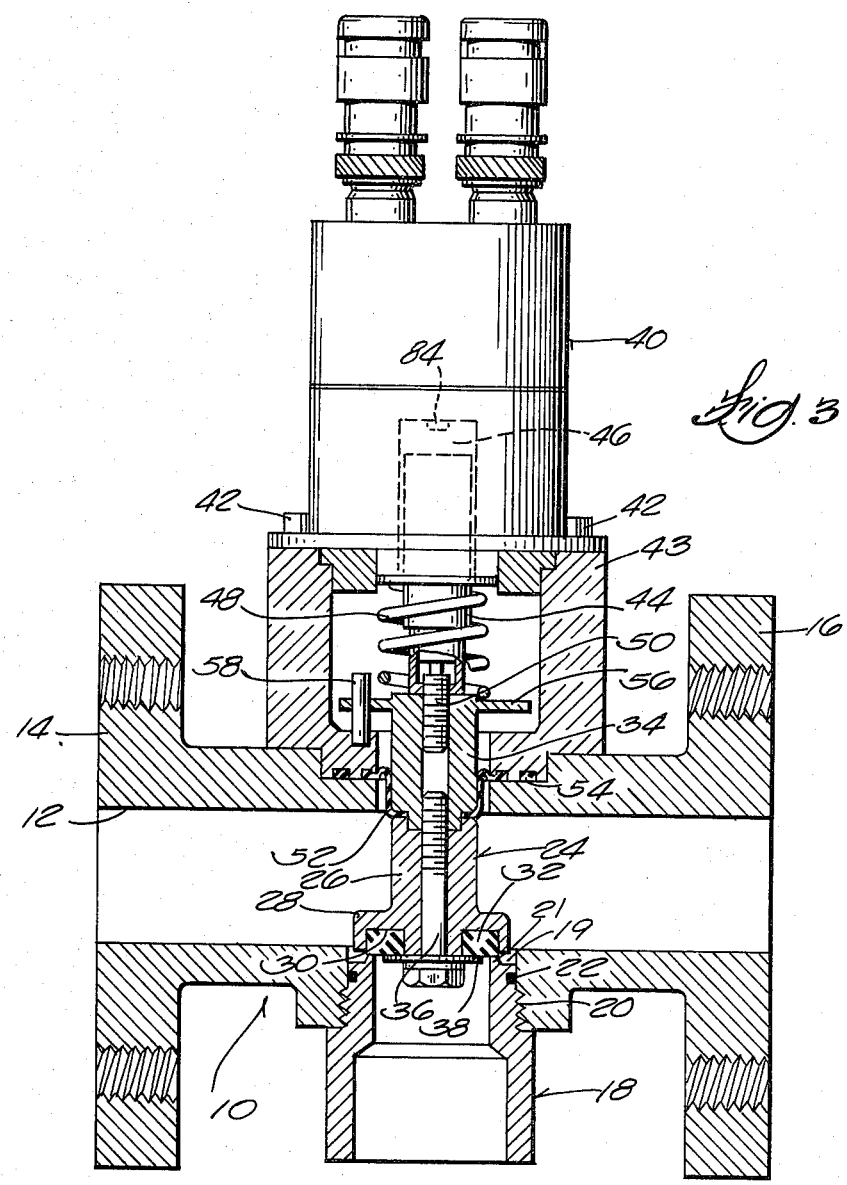
FIG. 3 is a partial sectional view taken along line 3—3 of FIG. 2.

Referring to the drawings in detail, as shown in FIGS. 1-3 the drain valve assembly of the present invention is comprised of a valve body 10 having a flow passageway 12 extending therethrough and a pair of flanges 14, 16 for connection of the valve to suitable piping (not shown).

A drain fitting 18 is mounted in the bottom of valve body 10. As best shown in FIG. 3, fitting 18 has external threads 20 for establishing a threaded connection to the body 10 and an O-ring 22 for sealing the fitting in the body.

A valve assembly 24 is mounted inside of valve body 10 opposite the end of drain fitting 18. Valve assembly 24 is comprised of a cylindrical member 26 having an enlarged head 28 with a circular groove 30 formed therein. A valve closure member 32 of resilient material is mounted in groove 30. Member 26 is removably attached to an actuator member 34 by a machine screw 36. Closure member 32 is removably held in groove 30 by a washer 38 which in turn is held in place by screw 36. The end of drain fitting 18 has an undercut portion 19 and a valve seat 21 formed on the end thereof. Undercut 19 provides clearance between head 28 of member 26 and fitting 18 when closure member 32 is seated on seat 21.

Valve assembly 24 is actuated by a solenoid operator 40 mounted on the top portion of valve body 10 by a plurality of machine screws 42 which extend down through openings in housing 43 for threaded connection to the valve body 10. The solenoid operator 40 is operatively connected to member 34 by a solenoid armature member 44 which is mounted for slidable movement in a solenoid cavity 46. A coil compression spring 48 is provided to bias valve assembly 24 to its closed position. A threaded pin 50 serves to removably attach member 34 to member 44. For reasons to be explained hereinafter solenoid operator 40 is provided with a double wound coil comprising a pull-in coil 80 and a holding coil 82 (see FIG. 4).

The opening in body 10 through which valve actuator member 34 extends into flow passageway 12 is sealed by a rolling diaphragm sealing member 52 and an O-ring sealing member 54.

It will be noted that actuator member 34 has a flange 56 on the upper portion thereof which cooperates with a pin 58 to prevent rotation of members 26 and 34 when machine screw 36 is removed and retightened into place when it becomes necessary to replace valve closure member 32.

Rotation of members 26 and 34 could rupture diaphragm member 52. Pin 58 is inserted through an opening in flange 56 and is seated with a press fit in a hole in housing member 43.

Figure 4:
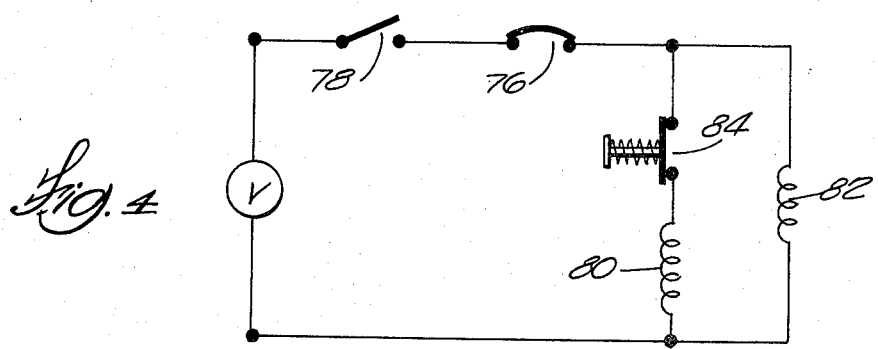
FIG. 4 is a partially schematic circuit diagram of a typical control circuit for the drain valve assembly of the present invention.

As best shown in FIGS. 1, 2 and 4 a thermostat assembly 60 is mounted in a cavity 62, which cavity is located in rear wall of valve body 10. The thermostat assembly 60 includes a thermostat element 76 and is removably mounted in such cavity by means of strap member 64 and screws 66. The sensor head 68 of thermostat assembly 60 is positioned in contact with or closely adjacent to the bottom wall 70 of cavity 62 to thereby enable the thermostat element 76 to sense the temperature of the fluid inside the valve body with a high degree of accuracy. In the preferred embodiment wall 70 is ⅛" thick. The contacts of thermostat element 76 are electrically connected to the solenoid operator 40 by a pair of conductors 72, 74.

OPERATION

As indicated previously, drain valve assembly of the present invention is specially designed for use in the cooling system of a diesel engine (or engines) used as the prime mover on a train locomotive. Diesel engines for train locomotives are usually operated continuously when in active service, in which event the cooling system remains warm even when the ambient operating temperatures fall below freezing. However, should the diesel engine stop running for any reason the potential danger of a cooling system freeze-up arises.

For purposes of explanation, assume, for example, that the diesel-powered locomotive is being used in a cold climate and is left running unattended in a train yard and due to some malfunction the engine stops running. The system will cool down to a predetermined point (at some thermostat temperature setting above 32° F.) at which point the thermostat element 76 (FIG. 4) will close. With reference to FIG. 4, it will be appreciated that main switch 78 of the control circuit must be closed for the system to operate as intended.

With switch 78 closed and thermostat element 76 closed, both coils 80 and 82 of the solenoid operator 40 will be energized. Pull-in coil 80 having a substantially greater number of turns than the holding coil 82 provides most of the force necessary to actuate the valve assembly 24 from closed to its open position against the bias of spring 48. As the valve assembly 24 reaches its fully open position, the end of armature member 44 will move into contact with the actuator of normally closed switch 84, causing it to open. The opening of switch 84 will deenergize pull-in coil 80. With the parts in this position the holding coil 82 provides sufficient force to hold valve assembly 24 in its open position. This holding phase of the operation can, of course, be accomplished with a considerably reduced amount of current draw than is required for initial actuation of the valve 24 from its closed position.

With valve assembly 24 moved to its open position, as described above, engine coolant (normally water) in the diesel engine cooling system will be drained from the system by gravity to outlet fitting 18. Switch 84 will remain closed until either thermostat element 76 or switch 78 is opened in which event holding coil 82 will be deenergized allowing valve assembly to move back to its closed position under the bias of spring 48.

It will be appreciated from the foregoing that should it become necessary to replace valve element 32, this can be readily accomplished by first removing drain fitting 18 from body 10 and then removing valve element 32 by unscrewing machine screw 36. As indicated previously, rotation of member 34 will be prevented by the cooperation of pin 58 and valve portion 56, thus preventing damage to rolling diaphragm sealing member 52.

It will also be appreciated that if for any reason it becomes necessary to repair or replace thermostat assembly 60, this can be readily accomplished by removing the assembly from the valve by first removing screws 66 and strap 64 and then unscrewing the electrical connector for conductors 72, 74. It will be appreciated that all servicing of the thermostat assembly can be accomplished without disturbing the cooling system in which the valve is installed. Such servicing can even be accomplished while the diesel engine is running. The drain valve assembly of this invention, therefore, provides an effective way to protect the cooling system of the diesel engine and accomplishes this function in an efficient and reliable manner.

We claim:

1. A drain valve assembly for a fluid system comprising:
   a valve body having a flow passageway therein and fluid connector means for establishing fluid connection between said flow passageway and a fluid system, said flow passageway of said valve body having a thermally conductive wall portion, said valve body further having a thermostat mounting cavity therein located opposite said thermally conductive wall portion;
   a drain assembly means including a drain port mounted in the lower portion of said valve body, said drain assembly means including a stationary valve seat surrounding said drain port;
   a valve assembly means mounted for reciprocal movement in said valve body passageway towards and away from said stationary valve seat, said valve assembly means including a valve closure member adapted to move into and out of sealing engagement with said stationary valve seat when said valve assembly means is reciprocated, said valve closure member being removably mounted in a valve closure mounting member;
   a solenoid operator means mounted on said valve body, said solenoid operator means operatively connected to said valve assembly means to impart a reciprocating movement thereto when said solenoid operator means is energized;
   a thermostat assembly means removably mounted in said thermostat mounting cavity of said valve body, said thermostat assembly means including a temperature sensing thermostat element positioned closely adjacent said thermally conductive wall portion of said valve body, said thermostat element being responsive to the temperature of the fluid in said valve body;
   electrical control circuit means including a source of electrical energy and electrical conductor means connecting said source of energy with said solenoid operator means and said thermostat assembly means, said electrical control circuit means operative so that when the temperature of said temperature sensing element of said thermostat assembly means reaches a predetermined minimum, said solenoid operator means will be energized to move said valve assembly means from its closed position to its open position; and
   said valve assembly further including an actuator member extending through an opening in the upper portion of said valve body, said actuator member interconnecting said valve closure mounting member with said solenoid operator means, said actuator member being sealed in said opening by a rolling diaphragm sealing member, said rolling diaphragm sealing member being captured between said valve closure mounting member and said actuator member.

2. A drain valve assembly according to claim 1 in which said actuator member has a flanged formed thereon and a pin mounted in said flange with one end thereof anchored in said valve body to thereby prevent rotation of said actuator member with respect to said valve body.

3. A drain valve assembly according to claim 1 in which said solenoid operator means has a pull-in coil, a holding coil, and a control switch means, said pull-in coil, holding coil, and control switch means electrically connected together so that when said thermostat contacts close, both said pull-in coil and said holding coil will be energized to move said valve assembly means from its closed position to its open position, said control switch means being further characterized so that it will be actuated to deenergize said pull-in coil following a given time interval after the initial simultaneous energization of said pull-in and holding coils.

* * * * *

UNITED STATES PATENT AND TRADEMARK OFFICE
CERTIFICATE OF CORRECTION

PATENT NO. : 4,232,696
DATED : November 11, 1980
INVENTOR(S) : Robert E. Burris and Robert J. Budyak It is certified that error appears in the above-identified patent and that said Letters Patent are hereby corrected as shown below:

Column 4, Line 51, Claim 2, After "a" and before "formed" delete "flanged" and substitute therefor ---flange---

Signed and Sealed this

Twenty-first Day of April 1981

[SEAL]

Attest:

RENE D. TEGTMEYER

Attesting Officer

Acting Commissioner of Patents and Trademarks